(12) United States Patent
Ng

(10) Patent No.: US 6,405,175 B1
(45) Date of Patent: Jun. 11, 2002

(54) SHOPPING SCOUTS WEB SITE FOR REWARDING CUSTOMER REFERRALS ON PRODUCT AND PRICE INFORMATION WITH REWARDS SCALED BY THE NUMBER OF SHOPPERS USING THE INFORMATION

(76) Inventor: David Way Ng, 3044 Whisperwave Cir., Redwood City, CA (US) 94065

( * ) Notice: Subject to any disclaimer, the term of this patent is extended or adjusted under 35 U.S.C. 154(b) by 0 days.

(21) Appl. No.: 09/361,545

(22) Filed: Jul. 27, 1999

(51) Int. Cl.[7] .............................................. G06F 17/60
(52) U.S. Cl. ............................ 705/14; 705/26; 705/400
(58) Field of Search ............................. 705/14, 10, 26, 705/27, 37, 400

(56) References Cited

U.S. PATENT DOCUMENTS

| | | | |
|---|---|---|---|
| 4,876,592 A | 10/1989 | Von-Kohorn | 358/84 |
| 5,056,019 A | 10/1991 | Schultz et al. | 364/405 |
| 5,237,507 A | 8/1993 | Chasek | 364/464.04 |
| 5,475,375 A | 12/1995 | Barrett et al. | 340/825.31 |
| 5,638,457 A | 6/1997 | Deaton et al. | 382/100 |
| 5,734,838 A | 3/1998 | Robinson et al. | 395/214 |
| 5,774,870 A | 6/1998 | Storey | 705/14 |
| 5,835,896 A | 11/1998 | Fisher et al. | 705/37 |
| 5,862,223 A | * 1/1999 | Walker et al. | 380/25 |
| 5,890,138 A | 3/1999 | Godin et al. | 705/26 |
| 5,924,072 A | * 7/1999 | Havens | 705/1 |
| 5,950,172 A | * 9/1999 | Klingman | 705/26 |
| 6,064,979 A | * 5/2000 | Perkowski | 705/26 |

FOREIGN PATENT DOCUMENTS

| WO | WO 00/50967 | * 8/2000 |
|---|---|---|

OTHER PUBLICATIONS

Festa, Paul, "Have an Epinion?", Jul. 9, 1999, CNET News.com, http://news.cnet.com/news/0, 10000, 0-1005-200-344591,00.html.*
Davis, Stan, "Perfect storm whips up economic change", Apr. 5, 1998, Times of London, Business section.*
MyPoints.com Web pages, Jul. 14, 1999.
Beenz.com Web pages, Jul. 19, 1999.
Epinions.com Web pages, Jul. 14, 1999.
Epinions press release, Jul. 12, 1999.

* cited by examiner

Primary Examiner—Jeffrey D. Carlson
(74) Attorney, Agent, or Firm—Stuart T. Auvinen

(57) ABSTRACT

A web site on the world-wide-web allows users to search a product/price database. The database contains product and price information for a wide variety of products from many different suppliers such as online and offline stores. Information in the database is collected and corrected by submitting users who are rewarded for product submissions. A submitting user inputs data on new product, price, supplier, or rating information using an online form. The user highlights coordinates of the model, make, and price on the supplier's web page, so that automated software can later check the supplier's web page for price and product updates. The submitting user is rewarded for submitting product and price information. When other consumer-users search the database and find the product, the submitting user is again rewarded. When these other consumer-users follow a link to the supplier's web page for that product, the submitting user is further rewarded. Thus future rewards depend on the number of consumer-users viewing the information submitted. Higher rewards are granted for more popular products. Correcting-users can correct errors when viewing the supplier's web page by pressing a correct-error button. The correcting user is rewarded and future rewards are shared among the submitting user and the correcting user as consumer-users view the corrected information.

19 Claims, 11 Drawing Sheets

| PARAM NAME 61 | CURRENT VALUE 63 | PAGE COORDINATE OR LOCATOR 65 |
|---|---|---|
| URL  62 | | |
| PAGE SUPPLIER<br>MAKE<br>MODEL<br>DESCR  64<br>PRICE | | |
| NEW OR USED<br>EXPIRATION DATE<br>QTY IN STOCK  66<br>SHIPPING CHARGE<br>TAX | | |
| ORDER METHOD  68<br>PYMT METHOD | | |
| LIST OF DATES UPDATED<br>PAGE VAILD Y/N<br>LIST OF COMMENTS<br>LIST OF RATINGS  67<br># HITS<br># LINK PASSTHROUGHS | | |

|  |  | POINTS CREDITED | |
|---|---|---|---|
| WHO | EVENT | USER A | USER B |
| USER A | SUBMIT INFO ON PRODUCT Q: URL, MAKE, MODEL, $ | 20 | |
| 100 | | | |
| S/W | S/W GETS URL, CHECKS INFO, POSTS MAKE, MODEL, $ TO DB | 4 | |
| --- | --- | --- | --- |
| 102 | | | |
| USER B | SEARCHES DB, FINDS PROD. Q | 1 | |
| USER B | FOLLOWS LINK TO PROD. Q | 15 | |
| USER B | POSTS + FEEDBACK CMT | +5 | 1 |
| USER B | POSTS - FEEDBACK CMT | -5 | 1 |
| USER B | CORRECTS WRONG INFO FOR PROD. Q | | 5 |
| --- | --- | --- | --- |
| 104 | | | |
| USER C | FOLLOWS LINK TO PROD. Q | 3/4 * 15 | 1/4 * 15 |

FIG. 5

SHOPPING SCOUTS WEB SITE FOR REWARDING CUSTOMER REFERRALS ON PRODUCT AND PRICE INFORMATION WITH REWARDS SCALED BY THE NUMBER OF SHOPPERS USING THE INFORMATION

FIELD OF THE INVENTION

This invention relates to computer-assisted electronic commerce (e-commerce), and more particularly to customer rewards programs.

BACKGROUND OF THE INVENTION

Consumer rewards programs have been widely used for many years. Supermarkets once issued value stamps or coupons that a consumer could accumulate and exchange for a reward or discount. Airline Frequent-Flyer programs reward travelers with free tickets once enough miles have been flown. Credit-card-like rewards cards are presented by shoppers at supermarket checkouts to receive instant price reductions.

Computers have been used to manage such rewards programs. See "Automated Purchase Reward Accounting System and Method", U.S. Pat. No. 5,056,019 by Schultz et al., and assigned to Citicorp of Stamford, Conn. Computer networks have also been used for reward-program administration. Frequent-Flyer miles in a person's account can be accessed over the Internet using the world-wide-web.

Increasing the Internet is being used for purchases. Online "virtual" stores are replacing the so-called "bricks-and-mortar" stores. A single virtual store can serve customers in many different cities and states without costly local stores. As demand increases, additional computers are merely added to the store, allowing phenomenal sales growth with relatively little capital outlay. As an example, Priceline.com, an online seller of airline tickets, reached one million customers in their first year of operation. To reach one million customers, traditional stores such as Wal-Mart have to build and open hundreds or more stores in many different cities, at a substantial cost and delay.

e-Commerce—FIG. 1

FIG. 1 is a diagram of electronic commerce (e-commerce) using the Internet. A shopper uses browser 10 on a local client personel computer (PC) to access web sites on Internet 20. The user can connect directly to online stores 12, 14, and can search for products within each store using the store's local search engine. For example, a user looking for a special book tittle can connect to amazon.com (of Seattle Wash.)as store 12, and to BarnesAndNoble.com as store 14, and perform two search for the book's tittle. Each store 12, 14 presents its price and book description to the user of browser 10. The user can then buy the book from the store with the lower price by pressing virtual buttons displayed on the web page. The user is then shown a checkout page, where the user enters his shipping address, credit card, and other information to complete the purchase.

The user may instead connect directly to online mall 16. Online mall 16 has private connection to store 12, 14 and other stores, perhaps receiving a database and updates of current product and price information from each store 12, 14. When the user performs a product search on line mall 16, prices from many different stores are presented together on the same web page, allowing a quick comparison. For example, a book in a local walk-in books that costs $15 may be available for $12 at store 12 (amazon.com.) However, a search for the book at online mall 16 shows another store 14 with the same book for only $10. Perhaps the user was not aware of the existence of store 14 since it is relatively unknown. The user thus saves an additional $2 by using online mall 16 to find an online store with lower prices.

While online malls are useful, often they have exclusive marketing agreements with some online stores that exclude other stores. For example, some online malls at web portals such as Yahoo! and Excite of Santa Clara, Calif. show books only from amazon.com and not from other online booksellers. A user of such an online mall is not told of the lower prices at competitors to amazon.com.

To perform a more thorough search, the user can also use a software program or agent known as an Internet robot or 'bot'. The user of browser 10 connects to 'bot' service 24 and enters the product information to search for. 'Bot' service 24 then sends out a search to stores 12, 14 for the product, and also searches other sites on the Internet. 'Bot' service 24 then reports its results back to browser 10.

Online auctions may also have the desired product for sale. 'Bot' service 24 may also perform a search at online auction site 18. Online auctions may provide much lower prices than online stores 12, 14. For example, a book that retails for $20 and is discounted to $16 at online store 12 may be found for $2 at online auction site 18 when few are bidding on the book. See U.S. Pat. No. 5,835,896 by Fisher et al., and assigned to Onsale, Inc. of Menlo Park, Calif. Some online auction sites 18 allow purchasers to leave feedback on sellers. Such feedback is accumulated and scored to provide other bidders with information about the seller's integrity.

Change-detection web site 29 can be used to periodically and automatically search online auction site 18 for a particular item and price. Thus items that are infrequently on auction can be found if the user is patient. See U.S. Pat. No. 5,898,836 by Freivald et al., assigned to NetMind Services, Inc. of Campbell, Calif.

Online Reviews

Internet shopping is powerful not only because of the lower prices found. Many product reviews are posted on the Internet. The user can read such product reviews at magazine review site 22. Some online malls 16 link shoppers to these product-specific reviews, allowing shoppers to compare products as well as prices.

Ordinary persons who are not members of the press can also post reviews and comments about products on the Internet. Newsgroups have traditionally been used by consumers to post comments about various products. Newsgroup search site 28 can be used to find such comments.

Unfortunately, finding product comments in newsgroups can be difficult, especially when the product lacks a unique marketing name that can be searched for. Some web sites are being created to collect product reviews and opinions from users. User opinion site 26 encourages users to leave product reviews by promising rewards for the reviewers based on the usefulness of the advice. Other readers vote on the quality of the product reviews, and the results used to rank the reviews.

While such product reviews and consumer comments and opinions add to the usefulness of the overall Internet, they may not be directly linked to the product pages of online stores 12, 14, forcing users to independently navigate to stores 12, 14. Since price information is not always linked to product reviews, users must still search for the lowest prices using 'bot' service 24 or online mall 16.

Although the cost of setting up an online store or service is much lower than for traditional stores and services, the cost is still significant. The time required to accumulate product reviews or build a database of products and prices for an online mall is significant. While software can be used to search for and collect information from the Internet, often the software is confused by the information retrieved, perhaps reading a phone number or product ID as a price. Human intervention and checking of this information is often required, at an added expense. As prices change, the database must be updated or corrected.

What is desired is a web site and service with a searchable database of products and price information. It is desired to collect product and price information from a wide variety of online stores and malls. It is desired to rapidly build the database at a minimum of cost. It is desired to use consumers to build and maintain the information in the database by allowing consumers to submit and/or correct product and price information. It is further desired to reward consumers for building and correcting information in the product and price database. Such rewards are preferably based on the relevance of the information supplied or corrected by the consumer, and by how often the information is used by other consumers.

SUMMARY OF THE INVENTION

A searchable database contains information submitted by rewarded users. A plurality of records each contain information presented to a searcher when search terms input by the searcher match terms in the record. A data-entry module receives information from a rewarded user. The information is written to a target record in the plurality of records.

A rewards database contains account records for users including a reward count for each user. A reward module is coupled to the rewards database. It is activated when the searcher views information in the target record. The reward module increases a reward count for the rewarded user when the searcher views the information in the target record submitted by the rewarded user. Thus the reward count for the rewarded user increases in proportion to a number of times that a searcher or another searcher views the information submitted by the rewarded user. Rewards for submitting information depend on a number of times the information is viewed by others.

In further aspects of the invention a network connection is coupled to the data-entry module. It receives information from the rewarded user on a remote node of a network and sends information to the searcher on a different remote node of the network. Thus the searchable database is accessed through the network. The network is an Internet, and the searcher accesses the searchable database though a web page search form and the rewarded user accesses the data-entry module through a web page entry form.

In further aspects a verifier is coupled to the data-entry module. It verifies information submitted by the rewarded user. The verifier re-fetches a web page containing the information submitted by the rewarded user from a network. The verifier locates the information submitted on the web page and enters the information into the target record when information on the web page matches the information submitted by the rewarded user. Thus information submitted is verified by re-fetching the web page before information is added to the searchable database.

In still further aspects the data-entry module receives the information from the rewarded user using an online form, an email message, or a file transfer. The information submitted by the rewarded user includes at least a portion of a uniform-resource-locator (URL) and a price, a product name, a manufacturer, a supplier, and/or a model name.

In further aspects of the invention a correction module is coupled to the plurality of records. It allows the searcher to correct information viewed from the target record. The correction module updates the target record to a corrected record. The reward module increases a reward count for the searcher when the searcher submits a correction. When another searcher views the information in the corrected record, the reward count for the searcher that submitted the correction increases. Thus the searcher receives future rewards when others view the corrected record.

BRIEF DESCRIPTION OF THE DRAWINGS

FIG. 4 illustrates a record in the product/price database.

FIG. 5 shows events and rewards earned by consumer-users.

DETAILED DESCRIPTION

Figure 1:
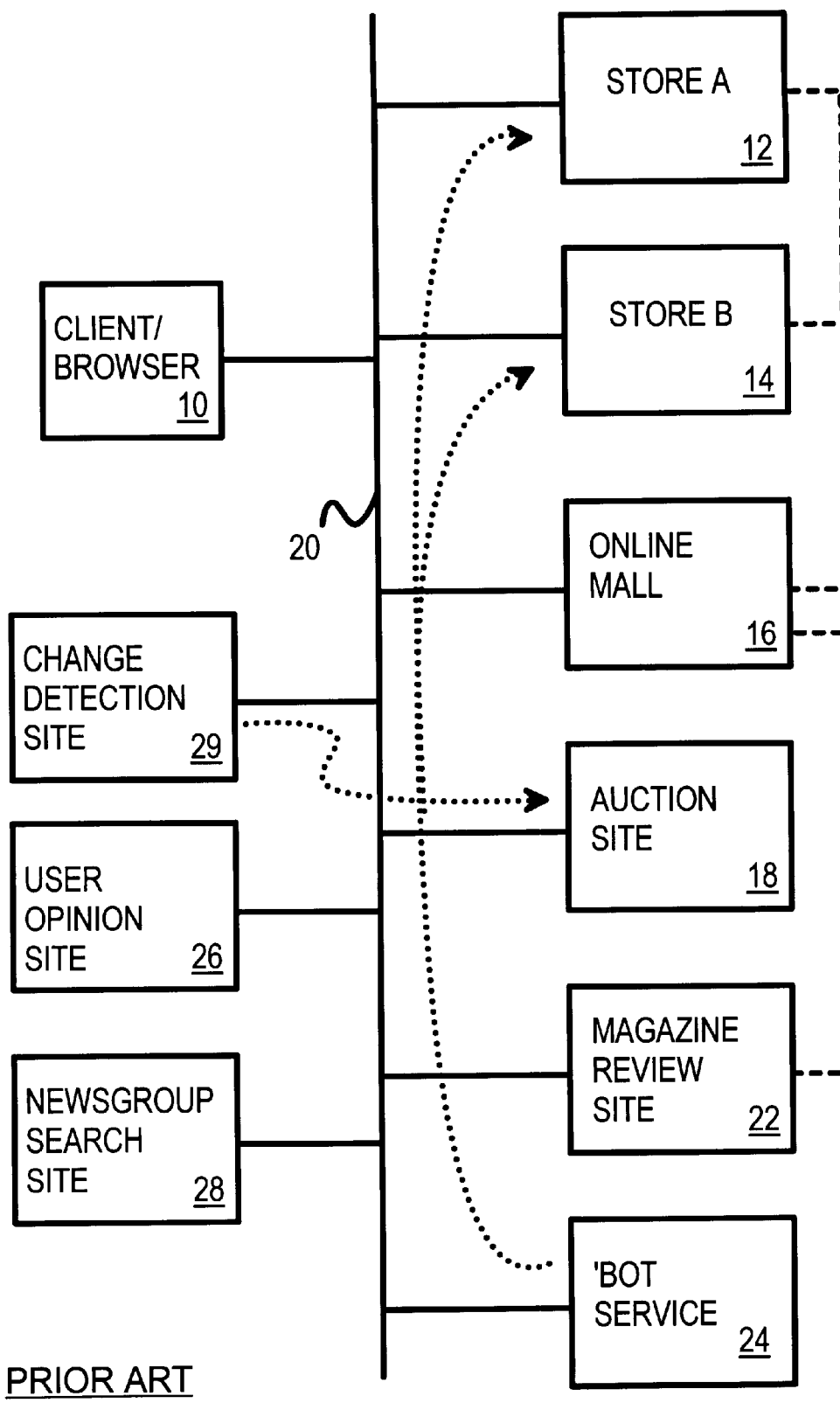
FIG. 1 is a diagram of electronic commerce (e-commerce) using the Internet.

The present invention relates to an improvement in electronic commerce. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

The inventor has realized that consumers can help to build and update a reliable product and price database. Consumers can be enticed to supply and correct product and price information when rewards are offered. Rewards that are proportional to the number of other persons who use the information supplied allow for large rewards for more useful information. Rewards for correcting information and updating prices encourage consumers to actively keep the database updated.

The product and price database is not limited to just a few online stores that happen to pay a fee or have a marketing agreement with the database site. Ideally, price information is kept for all major online stores. Consumers can update price information when they find lower prices for items not listed in the database.

Consumers are rewarded for supplying information about lower prices. When others use the lower-price information and follow a hyper-link to the store with the lower price, the rewards are increased. Thus both the consumer supplying the lower-price information and the consumers able to buy at the lower price are mutually benefited.

Rewards are scaled in proportion to the volume of users that actually use the updated information. Rewards for updating low-sales-volume products are less than the rewards for updating high-sales-volume products. Thus rewards are targeted toward more useful and relevant information.

A large database with many products can be assembled quickly by consumers and other Internet users. The incentives for being the first to supply new product and price information is significant, encouraging early users to spend their time collecting information for the new database site. Costs to fill the database with product and price information is reduced since consumers/computer users provide much of the information. Less staff time is required of computer professionals and engineers at the database-site company. As engineering salaries spiral upward and hiring of computer professionals becomes more difficult, using consumers to performs some of the data checking is even more beneficial.

Since correction of errors is also rewarded, the consumers have an incentive to correct database errors. The reliability of the database is improved. The more-reliable and up-to-date database then attracts more users, increasing the rewards to the users supplying and correcting information.

Figure 2:
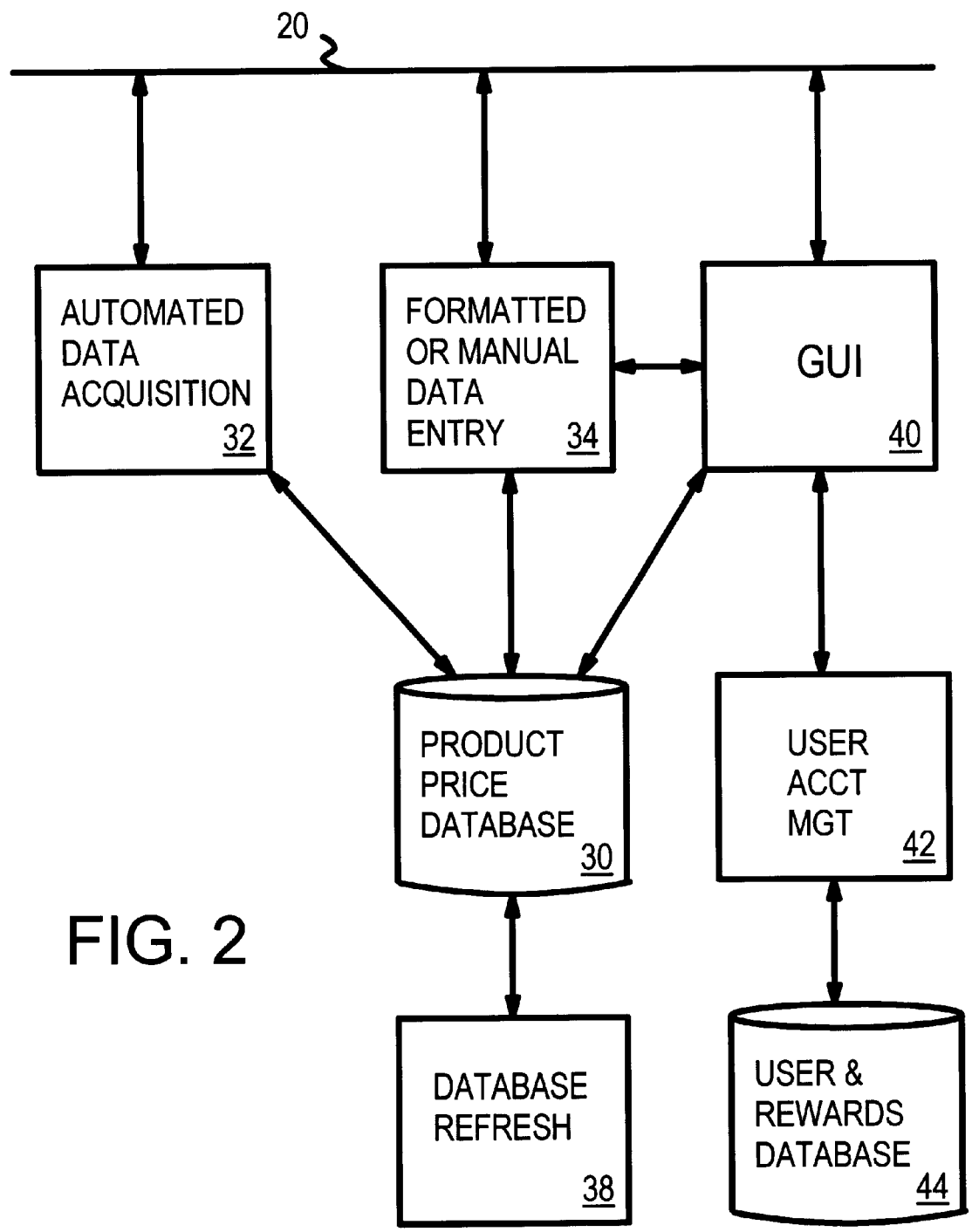
FIG. 2 is a diagram of the components of a web site for a product and price database that rewards users for maintaining the data.

Product/Price Database Web Site—FIG. 2

FIG. 2 is a diagram of the components of a web site for a product and price database that rewards users for maintaining the data. The web site connects to consumers and other users through Internet 20. Database 30 contains many records of products for sale. These records each include a lowest price for the product and an online store or supplier that is selling the product at that price.

Users can update information in database 30 through data entry module 34. Graphical-user-interface (GUI) 40 presents data from database 30 to a user. If the user finds a lower price for the product at another online store, he uses data entry module 34 to enter the new, lower price, and the store or supplier that has the lower price. Data entry module 34 then confirms the new price by fetching the product web page at the supplier's web site and verifying the price and product information. Once the new data is optionally verified, data entry module 34 enters the new data into database 30.

Software agents can also be used to search the web for product information. Automated data acquirer 32 searches product pages for various online stores and extract product and price information. This information is entered into database 30. However, since this information is automatically obtained by software, errors may occur or the information may be incomplete. The software may not correctly identify the price or product information. Consumers that find errors in the database records automatically obtained by automated data acquirer 32 can correct these errors using data entry module 34.

Consumers establish accounts at the database web site using account manager 42. Account manager 42 establishes an account record in user and rewards database 44 with information obtained from the user through GUI 40. When a user enters new product information or corrects existing information in product database 30, account manager 42 rewards the user by increasing a rewards count in rewards database 44. Also, when other users access data in database 30, or use that information to link to a supplier, account manager 42 increases the reward count for the user that supplied or corrected the information used by other users.

Database refresher 38 periodically checks records in database 30 by re-fetching supplier web pages referenced in database 30. Database refresher compares the product and price information in database 30 to that for the newly-fetched page and updates database 30 is necessary. When the price or product information cannot be found on the newly-fetched page, or when the page cannot be found, the record in database 30 is flagged and being in error.

Consumers can then check these errors found by database refresher 38 and receive rewards for making the corrections. A list of product records with known errors, and their uniform-resource-locator (URL) addresses of the supplier pages can be shown to users by GUI 40. The supplier web page can be presented to the user by GUI 40 with the data fields such as price highlighted in color. The user can check the error and move the highlight to a new location of the price on the web page. The newly-highlighted price can then be extracted into the database, and the new field location stored. Users then confirm the fixes to the errors and receive rewards.

Figure 3:
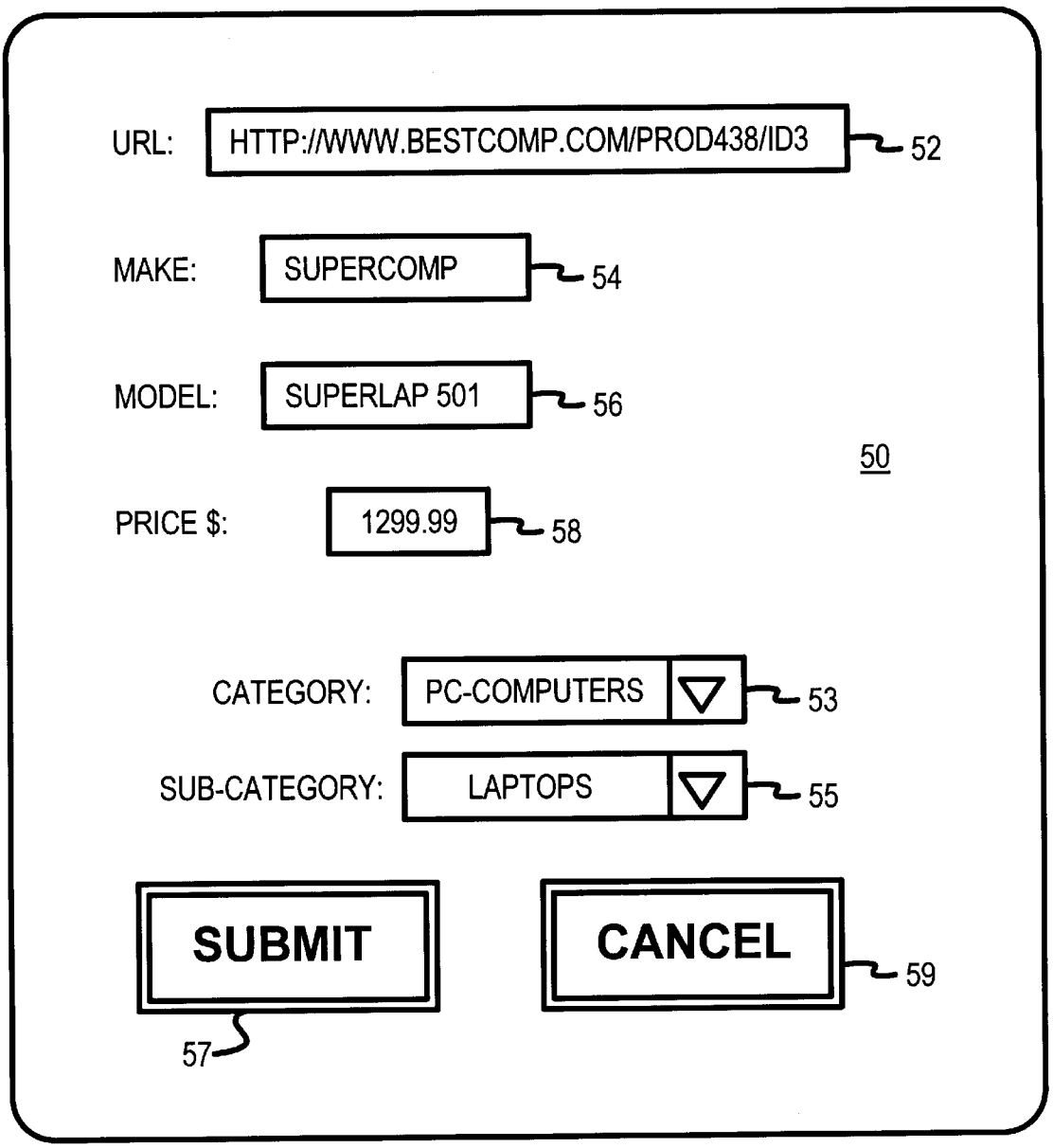
FIG. 3 is a form shown to a consumer-user, allowing product and price information to be input to the database.

Product/Price Entry Form for Consumer Input—FIG. 3

FIG. 3 is a form shown to a consumer-user, allowing product and price information to be input to the database. Form 50 is generated by the GUI and shown to the user on his browser window. The user types in or pastes the URL address for the supplier's web page that contains the product into URL-entry box 52. This URL is for the web page with the product and price information, sometimes known as a catalog page. Usually only one product or group of related products is shown on the supplier's web page. The URL is not for the supplier's home page or other index or multi-product web pages but is rather the low-level catalog page.

The user types in the brand or make into make box 54. This is typically the name of the manufacturer of the product, or of a product line that the manufacturer makes. Model box 56 is where the user types in the model-name of the product. A specific model name and number such as "SuperLap 501" is entered.

The price is entered into price box 58. Other boxes may be used for entering a product description, shipping or tax information, but these are not required. The overall category of the product is selected from a drop-down list of product categories using category box 53. The sub-category is selected from a drop-down list with sub-category box 55. In the example, the category is "PC-Computers" and the sub-category is "Laptops". These categories are defined by the database web site so that consistent names are used.

Once the user has finished entering the product and price information into form 50, he either cancels with cancel button 59, or he clicks on submit button 57 to submit the information to the database. This information is first verified by software and the user is allowed to make corrections to any errors the software finds.

The user can also tell the software the locations of the information on the supplier's web page. For example, the software can present the supplier's web page to the user with the product, make, model, and price fields highlighted. The user can verify the position of those fields or move the fields. The coordinates or locations of the data fields are then stored in the database, allowing software to automatically update database information by re-fetching the supplier's web page and extracting the product, make, model, and price information from the field coordinates. Thus the user sets the database up for later automatic retrieval.

Database Record—FIG. 4

FIG. 4 illustrates a record in the product/price database. Record 60 contains information about a single product for sale at perhaps dozens of different supplier's web sites. URL field 62 contains the URL address of the product or catalog page of the supplier with the lowest price. When a different supplier lowers their price to become the new lowest-price supplier, then URL field 62 is replaced with the URL for the new supplier's product catalog web page. Users cause this field to be updated by using form 50 of FIG. 3 when they find a lower price.

Parameter name 61 and the parameter's value 63 are stored for most parameters on record 60. Also, the coordinate or location on the supplier's product web page is stored for most parameters. Coordinates 65 are used by the database refresher to locate data for a parameter within a newly-fetched web page. Coordinate 65 can be an x,y coordinate, or a text string of text that precedes the data, such as a dollar sign "$" before a price. A bounding box may be defined over the parameter value on the web page.

Primary fields 64 contain the primary product and price information. A copy of the webage or other identifier within the supplier's web site is stored, along with the name of the supplier online merchant/store. The product's name, make, and model are also stored in primary fields 64, along with the price that the supplier is charging. The description field can be used to store additional information about the product. Optionally, a parameter name, value, and coordinate location on the web page are stored for each of these parameters.

Secondary fields 66 contains additional information about the product. Whether the product is new, used, or refurbished is included, along with an expiration date for a sales price and a quantity in stock when a limited quantity is offered. Shipping charges and tax cods can be included to identify which state's taxes must be paid or what the shipping charges are.

Payment details fields 68 contains information about the payment method (which credit cards, check, etc.) and how to order the product (online, by phone, mail-order, etc.). Usage fields 67 contain information about when the product's record was updated, and whether URL field 62 is still valid or has expired. A list of comments from consumer-users and ratings for the product can be included that link record 60 to specific comments or a linked list of comments.

Usage fields 67 also contain frequency counters that store the number of times users have found the page when performing a product search, and how many times consumer-users have followed a link and passed-through to the supplier's product page once they found the product using the search of the product/price database. If it is known whether the user actually bought the product, the number of times users bought the product can also be stored in usage field 67, although usually only the number of times users have followed a link is known since the supplier's product page is at an independent web site. Coordinates 65 are not stored for parameters in usage fields 67.

Some sites only allow access to registered users. Thus access to some URL's may not be possible. There are two solutions. One is for the product/price database web site to open an account at each of these sites, then use the account to gain access to these pages. Another solution is for the user to register or have been registered and login to the site. In any case, a field is added that indicates when membership or registration is required. A rating field can also be added to indicate if the supplier's web site is fast, slow, or a dead link.
Rewards Example—FIG. 5

FIG. 5 shows events and rewards earned by consumer-users. During session 100, consumer-user A fills out form 50 (FIG. 3) to submit new information about a product Q, including the make, model, and price, and the URL of the supplying store's product web page. The account manager adds 20 points to user A's reward count for submitting the new information.

The information submitted by user A is optionally verified before it is loaded into the product/price database for viewing by other users. Software uses the URL submitted to fetch the product web page from the online store selling the product at the low price. The software attempts to locate coordinates on the page to extract the make, model, and price. Often, a simple text search can be used to find the field. A search for "1299.99" should find the price field if the price submitted by user A ($1299.99) is still valid. The software can remember the location of the text found by the text search as the location or coordinate of the price field on the web page. The software may also store text strings that immediately precede or follow the price.

Sometimes the text search finds the wrong field. For example, the make of "Supercomp" may find text in a page header or banner ad, rather than in the product description. The software can display the product web page with the make field highlighted to the user. The user can then move the highlighting to the product description to correctly highlight the make information. Thus the user is queried to correct errors in automated software data acquisition. If the price of other information has changed, the user is allowed to correct the information.

Once the verification software is able to verify the product and price information, the information is posted to the database, allowing others to find the product in a search. User A is credited with another 4 points for completing the verification process. In the future, software can automatically refetch the product web page and extract the price and other information and updated the database, using the field locations approved by the user during verification. Thus a price increase should be automatically found and the database updated.

Later on, during session 102, user B searches for a product and finds product Q that was entered into the database by user A. User A receives one additional point for the database "hit" on product Q. The account manager increases the reward point count by one.

User B is presented with the price and basic product information such as the model name as a result of his search. Other products and prices may be listed as well. Hyper-links, which normally appear as colored underlined text, or as an icon, are displayed next to each product. If user B clicks on one of these hyper-links, his browser fetches the product web page for that product from the supplier's web site. The product web page normally shows more information, such as a picture and an extended description of the product.

If user B clicks on the hyper-link for product Q, user A is credited with another 15 points. User B can then view the product information and price on the seller's web page.

User B can leave feedback on the product by returning to the product-database web site and filling out a feedback form. The feedback can be either positive or negative. If user B really liked the product and the database information was correct and useful, he can leave a positive rating or comment. User A is then credited with another 5-point reward.

Perhaps user B bought the product and it didn't work. In this case, user B leaves a negative comment for the product. User B can leave a negative rating or comment for misleading information by the user, and 5 points are removed from user A's point total.

For either positive or negative rating or comments, user B is credited with 1 point for leaving the rating or comment. Other users can view user B's comment and other comments when deciding whether to buy the product. The user's overall rating for the accuracy and usefulness of the information, the quality and service of the supplier, the quality of the product can also be checked.

User B may find that some of the information in the product/price database is incorrect. Sometimes the price has changed or the information in the price/product database is incorrect. For example, user A could have indicated that the product was new, when it was really refurbished. User B may correct this information using a change form from the product/price database web site. User B is credited with 5 points for correcting the information.

When user B corrects information about product Q, rewards for product Q are no longer allocated strictly to user A. Now user B 'owns' some of the future rewards for product Q. The exact proportions of rewards can be varied with the information corrected. For example, correcting a price receives a higher portion of future rewards than does correcting information on whether the product is new or refurbished. Each field is assigned a number of points and has a unique 'owner' user, so that when the field is viewed, the user is awarded.

In session 104, user C follows a link to product Q. The 15-point reward is not split among users A and B. User A receives three-quarters of the 15 points (11.25 points). while user B receives one-quarter of the points (3.75 points).

At the end of sessions 100, 102, and 103, user B has 9.75 points. User A has 56.25 points, assuming that user B submitted positive and not negative feedback. These points can later be converted into prizes, such as bonus online time, special offers, telephone calling card minutes, hotel nights or frequent-flyer miles, other discounts, or even cash or stock in the database company.

Figure 6:
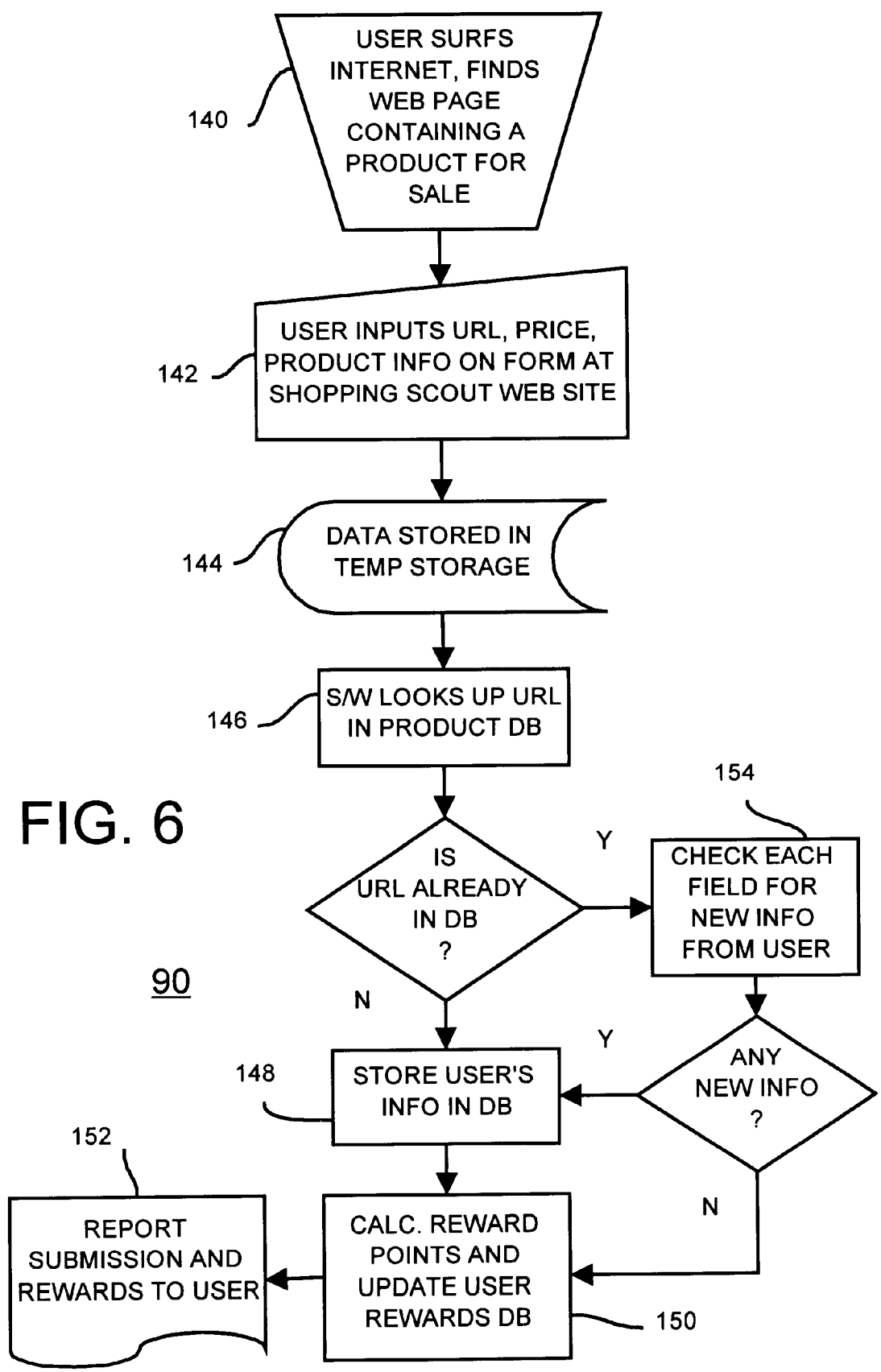
FIG. 6 is a flowchart of a consumer-user submitting product and price information.

Consumer Submission of Product/Price Information—FIG. 6

FIG. 6 is a flowchart of a consumer-user submitting product and price information. In this example, the product/price database is located at a web site for a fictional service known as the "Shopping Scouts". Submission routine 90 is one of several software routines used by the shopping scouts web site to update the product/price database.

A consumer-user surfs the Internet and finds a product for sale at an online store that is not necessarily affiliated with the shopping scouts web site, step 140. The user then opens another browser window and connects to the shopping scouts site, and navigates to the data-input form 50 (FIG. 3) which is displayed on his browser window. The user inputs the product, make, model, and price information onto the data entry form, step 142. The user can either manually type in the information, or preferably he uses the copy-paste function to copy information into the data-entry form from the other browser window that is viewing the supplier's product web page. The URL of the supplier's web page is also copied to the data entry form. Since these URL's are often long and complex, it is best to copy and paste the URL from the other browser window's URL/Address field rather than re-type the URL.

The URL, product, price, and any other information is stored in a temporary storage, step 144, rather than in the main product/price database. Verification software at the shopping scouts site then optionally reads the URL and re-fetches the supplier's web page, step 146. The URL is then compared to URL's in the product/price database to see if the product is already in the database, step 146. If the URL is already in the database, each field of information entered by the user in step 142 is compared to the fields in the database record, step 154. If any new information is found, then the new information is entered into the database, step 148.

When the URL is not in the database, the product from this particular supplier being entered is new. The URL, product and price information is optionally verified and loaded into a new record in the product/price database, step 148. The number of reward points is determined, based on whether the product is new or just some of the data is being updated. The additional reward points are added to the user's reward counter in the rewards and accounts database by the accounts manager, step 150.

The user is then sent a report, step 152, thanking him for submitting the new product information or for updating and existing product. The number of points awarded and his current total of reward points is also reported. When all the information was already in the database, the user is notified that no points were earned. This report can be sent by e-mail or as a message for the user within the shopping scouts web site.

Figure 7:
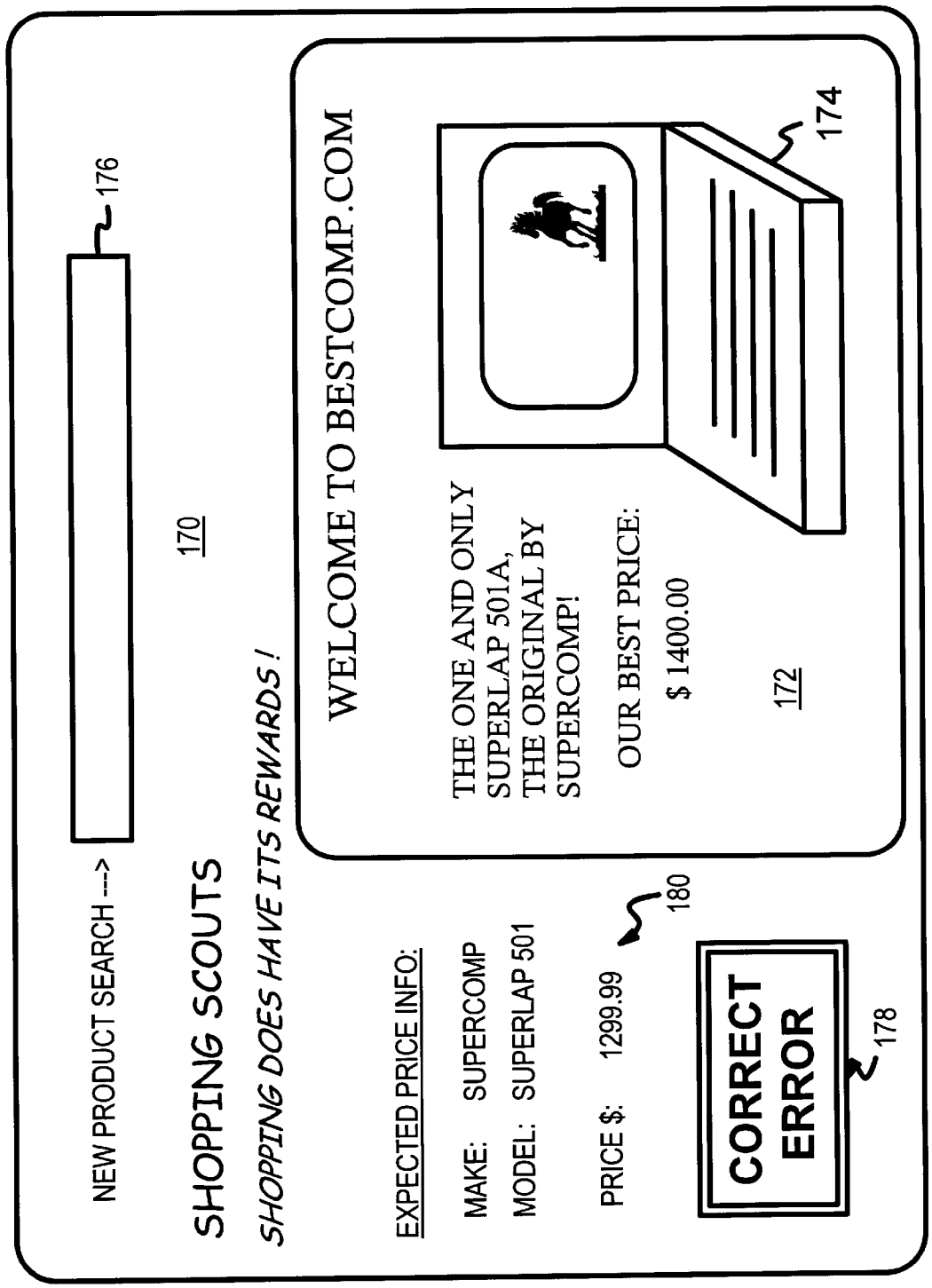
FIG. 7 is a product web page displayed to a user, which allows database errors to be corrected.

Product Display With Error-Correction Button—FIG. 7

FIG. 7 is a product web page displayed to a user, which allows database errors to be corrected. The user could be allowed to view the supplier's product web page as a normal full-screen web page. The user would then have to move back to the shopping scouts web site to enter corrections. The user may not be inclined to do this. Instead, a preferred embodiment shows the supplier's web page within a frame, with database information and a correction button placed in another frame on the display. This allows the user to quickly make correction while viewing both the supplier's web page and the database information.

Web page 170 is generated by the shopping scouts web site's servers. After a user has performed a search, and click on a link to view the product, web page 170 is displayed. Web page 170 includes frame 172, which displays the supplier's product web page. The data viewed inside frame 172 is from the supplier's online store, while the other data outside of frame 172 is from the shopping scouts web site.

Frame 172 includes a picture or image file of the product, laptop PC 174. A-product description that includes the make (Superlap) and model (superlap 501A) is shown in frame 172 from the web-page data retrieved from the supplier's web site (BestComp.com).

Web page 170 also includes database information 180, which is read from the product/price database and displayed outside frame 172. The make, model, and price from the database are displayed as the expected price information.

The price of $1299.99 in database information 180 does not match the price of $1400.00 from the supplier in frame 172. The supplier has apparently raised the price of laptop PC 174 since the database information for this product was compiled.

Although the make and model at first appear to be the same in frame 172 and database information 180, the model in frame 172 is "501A" rather than "501" in the expected database information 180. The model is slightly different, perhaps accounting for the price difference. Indeed, the model 501 laptop may have been replaced by the model 501A.

The user can correct this error by pressing error button 178. Another screen appears prompting the user to identify which fields are incorrect (the price and model) and to enter the correct data (1400.00 and Superlap 501A). Thus errors are easily spotted and corrected by consumers as they view, side-by-side, a product at the supplier's online stores and the database information.

Should the user wish to search for another product, he can enter the search keywords in search box 176. A new search is then performed.

Figure 8A:
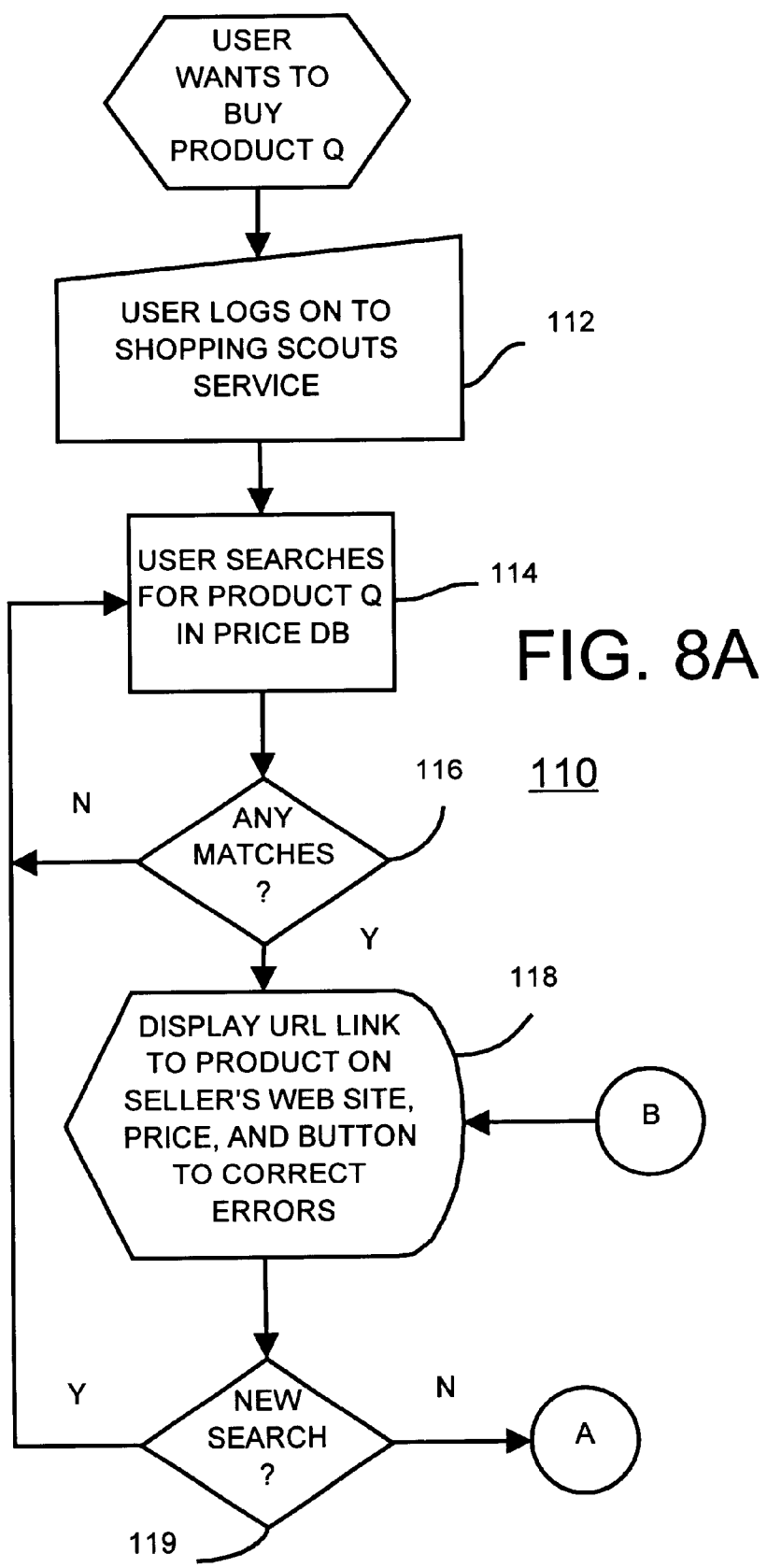
FIGS. 8A, 8B are a flowchart for a consumer-user searching the product/price database and correcting errors in the database.
Figure 8B:
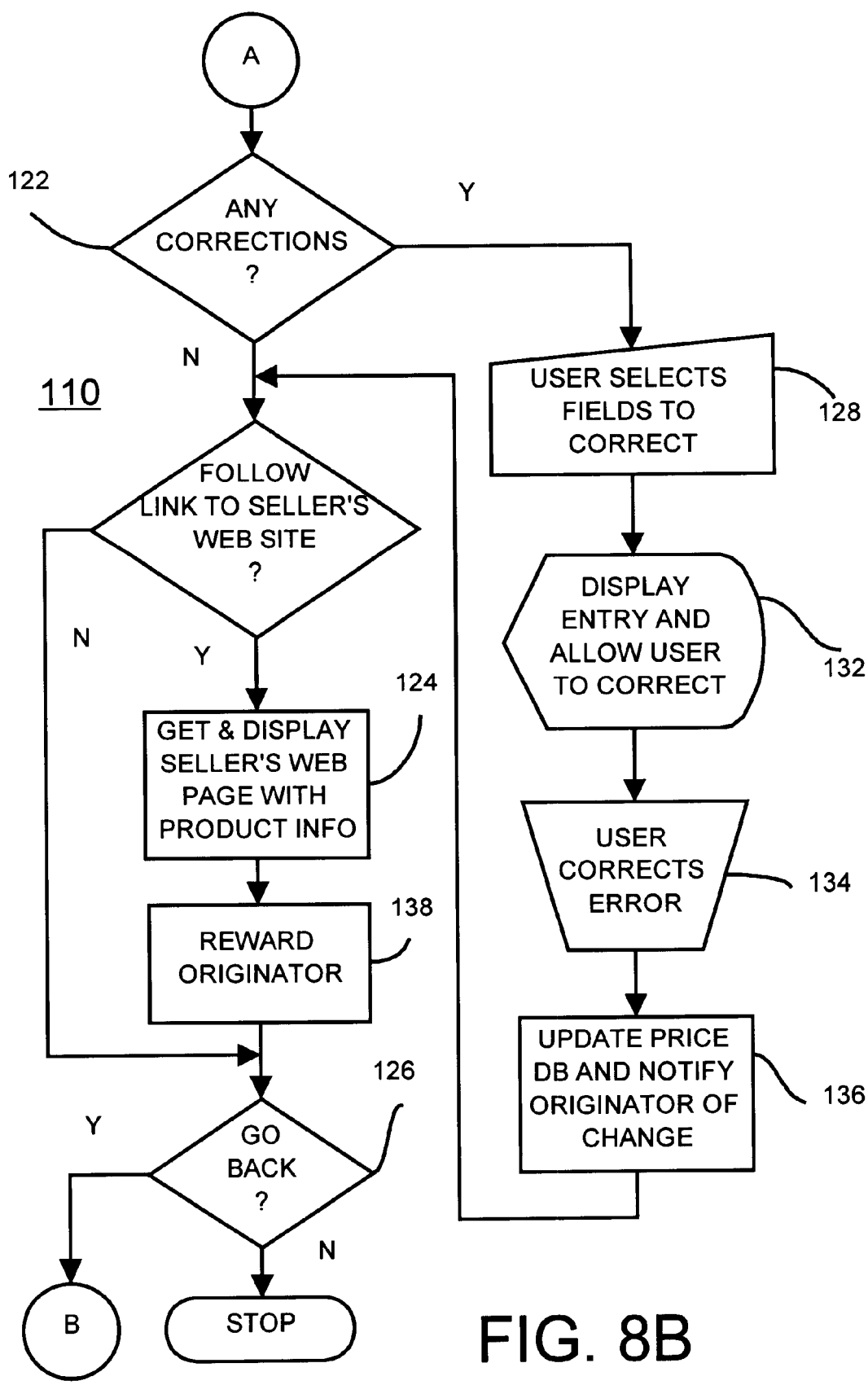

User Search and Correction—FIGS. 8A–8B

FIGS. 8A, 8B are a flowchart for a consumer-user searching the product/price database and correcting errors in the database. Search and correction process 110 may include several sub-routines and variations not shown. In FIG. 8A, a user desired to buy product Q at the lowest possible price. The user logs on or connects to the shopping scouts web site, step 112, knowing that other shoppers may have looked for the same product at many online stores and malls, and the lowest price they found should be listed in the product/price database.

The user searched the product/price database for the product name, step 114, or perhaps using a more advanced search with a combination of the make, model and other information. If no matches are found by the search, step 116, then the user can repeat or modify the search. Otherwise, when a match is found, the matching product or products are displayed to the user, step 118. Several products may first be listed together on a first web page, with URL links to each product and supplier's web page. When only one product is displayed, the database information for the expected price can be displayed next to the seller's web page in a frame, as shown in FIG. 7. A button or icon allowing the user to correct an error in the database is also shown by the database information.

The user can then choose to perform a new search, step 119, and return to the search step 114. The user can simply type in a search term and execute the search immediately, or can click on a button to return to a search-entry page.

Continuing in FIG. 8B, the user can make corrections by pressing the "correct-error button, step 122. The user then selects which fields to correct, step 128. The current information for that field is displayed to the user, step 132, allowing the user to correct the error, step 134. Many variations of user interfaces and web pages and forms can be used to allows the user to change errors, some by showing the supplier's web page with the new information alongside the database information. When the user knows of a new online store with a lower price for the product, he can enter the new URL and enter the new price. The software may ask the user to locate the make, model, and price fields on the supplier" web page using highlighting or another method.

After the new information is optionally verified, the new information submitted by the user in step 134 is entered into the product/price database, step 136.

After any corrections are entered, or when no corrections are made, the user can follow the link to the supplier's web site to complete the purchase. If the user clicks on a link to the supplier's web site, the seller's web page with price and product information is retrieved, step 124. This can be performed either within a frame within the shopping scouts web site, or the browser can directly navigate to the seller's web site. When the user follows a link to the seller's web site, the originator or person who first submitted the product and price information is rewarded, step 138. Other users who corrected information may also share in the reward, as shown in FIG. 5.

If the user does not follow the link to the seller's web page, or the user moves back to the shopping scouts web site using the browser's back command, the user is returned to the last product display, step 118 of FIG. 8A. Otherwise process 110 ends after a timeout period.

Figure 9:
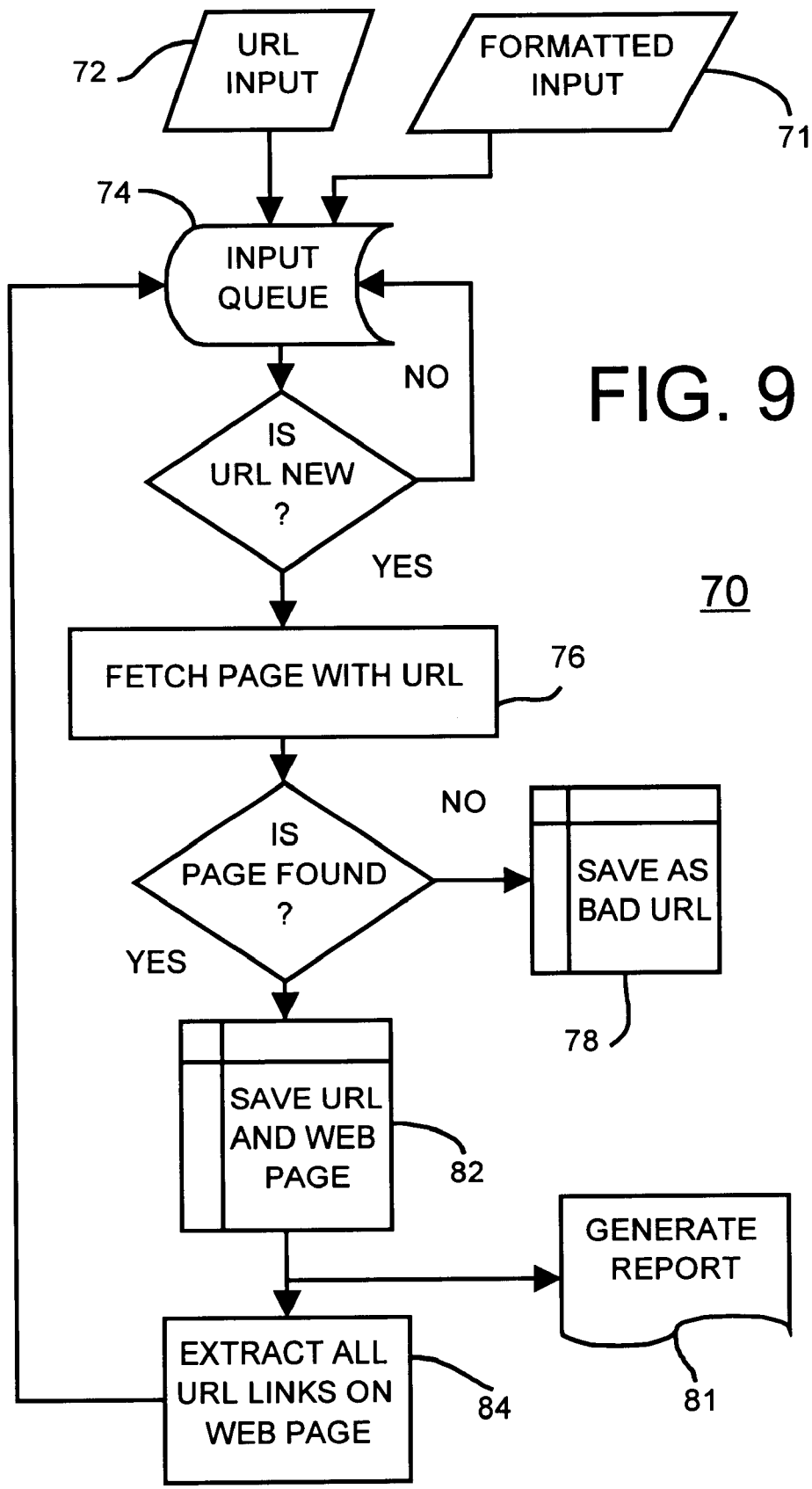
FIG. 9 is a flowchart of software that acquires price and product information from external web pages.

Automated Data Acquisition—FIG. 9

FIG. 9 is a flowchart of software that acquires price and product information from external web pages. This corresponds to automated data acquirer 32 of FIG. 2. This process is optional but useful for more rapidly building up the database. Users can also enter information for many products at once using a formatted data entry interface to data entry module 34 of FIG. 2. Data acquisition process 70 operates using software at the shopping scouts web site, loading data into the product/price database.

Initial URL's are input, step 72, to input queue 74. System administrators at the shopping scouts web site can enter starting URL's of various online stores. Users can also input URL, price, and product information using a formatted method, using a file such as a comma-separated text file, step 71. Using formatted input allows users to enter many products at once rather than just one at a time suing form 50 of FIG. 3. The URL's from user's formatted files are also input to input queue 74.

Each URL entry in input queue 74 is compared to existing URL's in the product/price database. If the URL already exists in the database, the following URL is selected from input queue 74. Otherwise, the supplier's web page is fetched from the Internet, step 76, using the URL from input queue 74.

If the web page pointed to by the URL cannot be fetched, the URL is loaded into bad URL storage 78. These bad URL's can be checked later by being re-loaded into input queue 74. Sometimes web pages are temporarily unavailable when the online store performs maintenance or when network problems occur.

When the web page is found, the product and price information is extracted from the web page. The page's URL, the product make, model, and price information extracted are then stored in the product/price database, step 82. The software may not extract all fields correctly, so some of the data may be in error. Users can be encouraged to check the extracted information and correct errors by the promise of rewards for error correction. A list of newly-extracted web pages can be made available to user, allowing them to check these new pages. Also, when software is unable to find data fields on the web page, and error can be flagged, and a list of web pages with flagged errors can also be posted at the shopping scouts web site, allowing users to earn rewards by checking wand correcting these pages.

The web page is also searched for hyperlinks. Each of these hyperlinks that points to a different web page have their URL's extracted, step 84. These extracted URL's are then loaded into input queue 74. Thus process 70 can crawl through a supplier's web site, following links to find other products that can be added to the database.

Reports 81 are also generated for the system administrators. Users who submit formatted files of URL's also receive reports 81 that list which URL's were new and valid. Reports 81 also include the number of reward points given to the user for the URL's submitted. Formatted data submission thus allows users to quickly earn large rewards, while the shopping scouts web site quickly builds up the product/price database.

However, when formatted data is received, it may go through a different process. In this alternative, the data only has to be checked against the database to see if there is new or updated information, similar to manually submitting many products. A report is generated showing the results.

Figure 10:
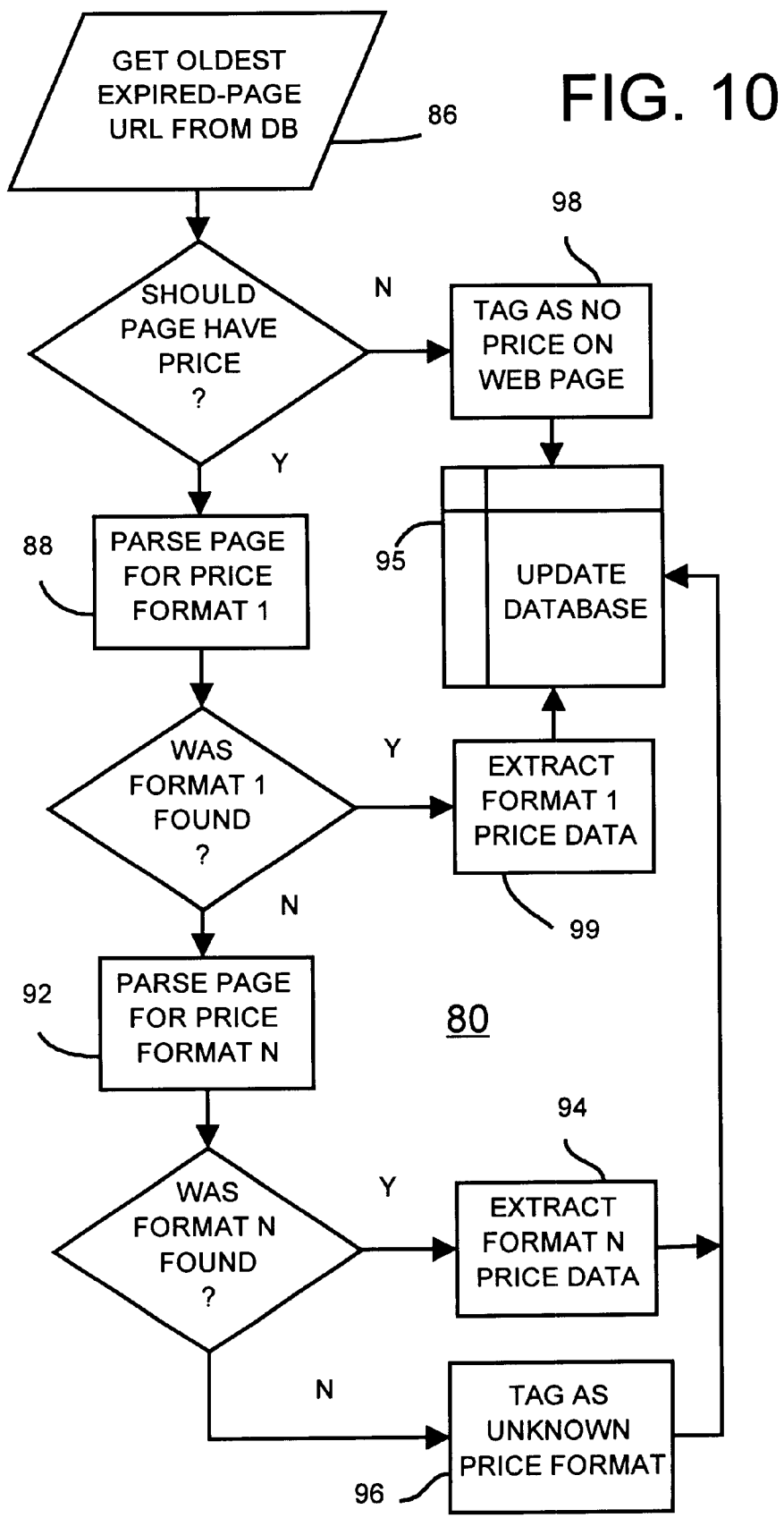
FIG. 10 is a flowchart for a database refresh routine that checks for price changes of products in the product/price database.

Database Refresh—FIG. 10

FIG. 10 is a flowchart for a database refresh routine that checks for price changes of products in the product/price database. This routine is optional. Refresh routine 80 is used to check for price changes of existing products in the product/price database. A list of expired web pages, or pages that had error when the pages were last fetched, are input to refresh routine 80. Pages can expire when a sale ends when the expired field in the record is used. The oldest of the expired web pages is read from the list, step 86.

When the database record for the expired page indicates that no price exists on the web page, then the page is tagged as having no price, step 98. The database is updated, step 95. When the database record indicates that the page should have a price listed, the web page is fetched and parsed for a first price format, such as a preceding dollar sign "$", step 88. If a price is found in the first format, the price is extracted, step 99, and the product/price database updated with the new price, step 95.

When format 1 is not found on the web page, then other price formats are searched for, step 92, up to a last format N. Other price formats could include a price with a decimal point followed by two numerals, but without a preceding dollar sign. When one of these formats is found, then the price is extracted, step 94. The database is then updated with the extracted price, step 98.

When no price is found using any of the N price formats, the product record is tagged as having an unknown price format, step 96. The product/price database is updated, step 95. A list of such web pages with unknown price formats can be generated, allowing system administrators or user to check. A new price format may have to be defied.

ADVANTAGES OF THE INVENTION

A web site and service contains a searchable database of products and price information. This product and price information is collected from a wide variety of online and offline stores and malls. The database is rapidly built at a minimum of cost. Consumers are used to build and maintain the information in the database by allowing consumers to input, correct, and rate product, price and supplier information. These consumers are rewarded for building and correcting information in the product and price database. Such rewards are based on the relevance of the information supplied or corrected by the consumer, and by how often the information is used by other consumers.

Consumer-users are rewarded for entering and correcting product information. The value of these rewards (the points given to them) is based on the importance and relevance of the information supplied. Some data may be given more points than others, such as one point for product name and price, but a quarter-point for shipping costs. Users are also rewarded over time as more users access the product information. Users have a strong incentive to submit accurate information, since they can loose future rewards to other users that find and correct errors in the information submitted. In addition, other users can correct obvious errors from rogue users who enter obviously false data. The database is built and maintained by users through an incentive awards program and rating system.

Shoppers benefit by finding the best deals. Shoppers are rewarded for finding better deals. Shoppers find accurate information using the database, because shoppers are rewarded for correcting erroneous information. Shoppers can receive high-quality information because shoppers are rewarded for providing feedback on the quality of the information. Shoppers find the items they want, because shoppers get more rewards for providing information on items that people want. These advantages will attract more shoppers, which in turn increases the valuation of the website, which in turn will increase the value of the shopper's rewards such as company stock.

ALTERNATE EMBODIMENTS

Several other embodiments are contemplated by the inventors. For example the web site can be marketed to the public with any of a number of different names and addresses. Private databases can be used within a company or organization for such purposes as suggestion and quality-improvement programs. A category dedicated to corporations can be added so that only corporate users have access.

Parameter names do not have to be stored when records have a fixed format. The location within the record then identifies which parameter data or a coordinate is for. Owner and timestamp fields may be added to. records, and the accounts database may be merged with the product/price database or act as a separate database. Many partitionings of data records are possible. Fields can be added for a quality or reliability rating of the supplier or manufacturer, and for links to ratings by other users. Users can be given accuracy ratings based on the number of errors that have been detected in their product submissions, or based on feedback comments by other users. When a submitting user's information is corrected by another user, the submitting user may be notified by email and allowed time to appeal, giving reasons why the correction was not warranted.

Future computers may resemble telephones or other appliances. A wide variety of such devices could be used to access the shopping scouts web site. Handheld shopping assistants, perhaps with bar-code readers could be carried by shoppers into offline stores to compare prices with those at online stores. Data can be kept in the product/price database for both online and offline stores. Many variations and improvements can be made to the shopping scouts web site and the software routines and forms displayed. Rewards can be varied and adjusted over time. Negative rewards may or may not be used when errors are reported. Reward points can be given for other activities, such as merely using the product/price database or referring other persons to the web site.

The invention can be applied to other kinds of databases besides product/price databases. For example, users could enter doctor referrals, mortgage referrals, insurance referrals, spare-parts referrals, job postings, or rental listings and make is corrections. Users could post information about sites to download music, movies, software, or interesting articles, surveys, elections. A category that mirrors news group listings can be added. An open category may be used where anything can be submitted. Users with specific interests may be given specific categories. Many different user interfaces, online forms, and partitioning of software modules can be used. Off-the-shelf database managers and web servers can be used in conjunction with the web service. Other information can be added to each product record, and different kinds of records can be used for different products. Duplicate records for identical products at different online stores can be used, perhaps giving consumers the 2 or 3 lowest-priced stores for the product. Price information for off-line stores can also be included.

Users can input a product and a price that they are willing lo pay for products they would like to buy, rather than actual products they find. Other users could then search for these products and inform the submitting user. Variable prices can also be used, such as bid and ask prices, or prices that vary with the day and hour, or auction prices. The web site can also directly handle purchase transactions, rather than simply refer users to the supplier's web site. Additional reward points can then be given to the submitting user when another user actually buys the product. The product/price database can rely on advertising revenue or referral fees from suppliers.

Rewards may also be scaled in proportion to how other's rate the information. This gives users a further incentive to make sure the information is accurate, useful and honest. This alternative should discourage submitting information that simply provides links to the actual page with the product, since users can rate this so low that no one will want to see it. Users can also submit suggestions for improving the website and rewards are given on ideas used, such as a suggestion for a new category or sub-category. To prevent fraud, software is used to detect suspicious activities such as users driving up ratings and hits for their friends. Links can be provided to product review information.

Several different methods of data input were described. Users can manually input data on a product using a graphical-interface form. More advanced users can assemble information on many different products and format this multi-product information in a file with a specific format, such as comma-separated-records. The exact format can be varied, and several different formats may be accepted. Other methods of data input may also be used, such as and file-transfer protocols (FTP), email, even fax or mail that can be scanned and read by optical-character-recognition (OCR) software. Web surfing capabilities such as address, back, forward, stop, and home buttons can also be implemented on form 170 so that the user doesn't have to leave the shopping scouts web site. The web site may rely on users to verify and refresh data, rather than using automatic verification and refresh.

The web site includes software to follow all links on a page to find other products. A system administrator can enter a URL as a start point, such as a home page at an online store or mall. The automated data-acquisition software then finds and follows all links. URL's for products entered by users can also serve as start points for the automated data acquirer. Multiple processes or jobs can be launched and processed in parallel. Various filters can be used to automatically find data on pages that are found. Fraud-prevention software can be used to detect certain suspicious activity by users, such as submitting dummy information. Rewards may be inhibited when the submitting user views his own products so that users cannot reward themselves merely by repeatedly viewing their own submissions. Various software and web agents and assistants can be used to help users enter data as a user surfs the web. Software may be used to prevent a single user from having multiple user names.

Routine backups of the database are made. Databases or a subset can be set up on mirrored web sites. Security features are implemented to protect privacy of users and integrity of the data. Targeted advertising can be implemented since it is known what a the shopper is looking for. Non-textual information such as pictures or videos can be submitted. While increasing reward counts has been described, inverse reward counts or other algorithmic tricks can be used to store reward counts in many different formats. However, these still "increase" reward counts even when the reward value is stored in an unusual format.

Users can be used to help identify various features on a webpage. For example, in one embodiment, users can identify an advertisement. This way, when users surf the internet through the website, the website can replace the ads on the target webpage with other ads. Ad space is valuable. Of course, the user identifying the box will gain from every ad replaced every time the page is viewed.

In another embodiment, the website allows users to download a special shopping scout's browser which can optimize for ease of use, efficiency, and capabilities.

To simplify data entry by user, software can be used to extract all known data from a target webpage beforehand, and it is presented to the user for review and for additional information.

In another embodiment, since some suppliers require membership to access it's website, the website can record the steps the user took-o logged in, remember the account and password information, and login for the user on subsequent visits to that site.

Ways to present the searched results to the user can be customizable. The data can be sorted by various methods like lowest price, most frequently visited, or best ratings. User can select the fields and the order in which it is displayed.

Methods can be devised to prevent cheating. For example, user A submits the price of a product for $200, which is the actual price. User B submits a corrected price of $100, which is wrong, but this way, user C can resubmit $200 to attempt to take ownership. In this case, the software would realize that user A first submitted $200, so ownership goes back to A. User C could receive points for confirming the correct price while user B could be penalized. Careful records of user activities have to be kept. Of course in this case, user A could have appealed also.

Users can vote for the most accurate entry. The owner of the entry with most votes receives more rewards when the information is viewed by other users. For example, a user can vote for the most accurate product description from a list submitted by other users, or the user can add his own description to the list. Each time this product is viewed by some user, the owner of the description with most votes will get 10 points, next one down gets 2 points, and so on.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

I claim:

1. A searchable database of information submitted by rewarded users comprising:

a plurality of records, each record containing information presented to a searcher when search terms input by the searcher match terms in the record;

a data-entry module for receiving information from a rewarded user, the information being written to a target record in the plurality of records;

a rewards database containing account records for users including a reward count for each user; and a reward module, coupled to the rewards database, activated when the searcher views information in the target record, the reward module increasing a reward count for the rewarded user when the searcher views the information in the target record submitted by the rewarded user;

a verifier, coupled to the data-entry module, for verifying information submitted by the rewarded user, the verifier re-fetching a web page containing the information submitted by the rewarded user from a network, the verifier locating the information submitted on the web page and entering the information into the target record when information on the web page matches the information submitted by the rewarded user, wherein the reward count for the rewarded user increases in proportion to a number of times that a searcher or another searcher views the information submitted by the rewarded user, whereby rewards for submitting information depend on a number of times the information is viewed by others and whereby information submitted is verified by refetching the web page before information is added to the searchable database.

2. The searchable database of information submitted by rewarded users of claim 1 further comprising:

a network connection, coupled to the data-entry module, for receiving information from the rewarded user on a remote node of a network, and for sending information to the searcher on a different remote node of the network, whereby the searchable database is accessed through the network.

3. The searchable database of information submitted by rewarded users of claim 2 wherein the network is an Internet, the searcher accessing the searchable database though a web page search form and the rewarded user accessing the data-entry module through a web page entry form.

4. The searchable database of claim 1 wherein the information submitted by the rewarded user includes the location of an advertisement, wherein when the advertisement is replaced by another advertisement, the person is rewarded when the advertisement is viewed.

5. The searchable database of claim 4 wherein the information submitted by the rewarded user includes at least a portion of a uniform-resource-locator (URL).

6. The searchable database of claim 5 wherein the information submitted by the rewarded user further includes one or more items from the group consisting of a price, a product name, a manufacturer, a supplier, and a model name.

7. The searchable database of claim 6 further comprising:

a URL queue containing a plurality of URL's;

an automated data acquirer, coupled to the plurality of records, receiving a starting URL from the URL queue, for fetching a web page pointed to by the starting URL, the automated data acquirer parsing the web page for links to other web pages, the automated data acquirer extracting URL's for the links and writing the URL's to the URL queue;

wherein the automated data acquirer also searches the web page for product and price information, the automated data acquirer writing the product and price information to a target record in the plurality of records, whereby links on a web page are followed to other web pages and product and price information is acquired automatically by the automated data acquirer and manually by the rewarded user.

8. The searchable database of claim 7 wherein a URL submitted by the rewarded user is input to the URL queue, the automated data acquirer searching the web page submitted by the rewarded user for links to other web pages, whereby links to other web pages from a user submission are followed to find other product and price information.

9. The searchable database of claim 3 further comprising:

a correction module, coupled to the plurality of records, for allowing the searcher to correct information viewed from the target record, the correction module updating the target record to a corrected record;

wherein when another searcher views the information in the corrected record, the reward count for the searcher that submitted the correction increases, whereby the searcher receives future rewards when others view the corrected record.

10. The searchable database of claim 9 wherein the reward count is decreased when a user redeems a reward for a prize, a discount, money, or stock in a company that operates the searchable database.

11. A computer-implemented method for receiving new product and price data from consumer-users that are rewarded, the method comprising:

receiving an address of a supplier web page that shows a product and a price for the product from a first user;

fetching the supplier web page from an Internet using the address received from the first user;

finding the price and a product name on the supplier web page;

storing the address, the price, and the product name in a first record in a price database when the price is verified;

increasing a first reward count for the first user when the price is verified;

notifying the first user when the price cannot be verified;

searching the price database for a product matching a search request by a second user;

displaying a portion of the first record to the second user when the first record matches the search request;

increasing the first reward count for the first user when the first record is displayed to the second user;

wherein the first reward count is increased as other users view the first record;

whereby the first user is rewarded when the second user and other users views the first record with information submitted by the first user.

12. The computer-implemented method of claim 11 further comprising:

displaying the supplier web page to the second user when the second user activates a link displayed for the first record; and increasing the first reward count for the first user when the second user activates the link for the first record, whereby the first user is rewarded when the second user or other users follow links to the supplier web page.

13. The computer-implemented method of claim 12 further comprising:

receiving a formatted file from the first user, the formatted file containing the address of the supplier web page, the price, and the product name for the first record, and other addresses, prices, and product names for other records in the price database, whereby the first user submits multiple product information using the formatted file.

14. The computer-implemented method of claim 12 further comprising:

displaying a submission form to the first user, the submission form for receiving the price, the product name, and the address of a supplier web page that shows a product and the price for the product;

whereby the first user submits information using an online form.

15. The computer-implemented method of claim 14 further comprising:

the first user identifying the product name and the price on the supplier web page;

creating pointers to locations of the product and price identified by the first user on the supplier web page;

storing the pointers in the first record;

refreshing the price database by re-fetching the supplier web page from the Internet using the address stored in the first record;

locating the price and the product name on the supplier web page using the pointers stored with the first record;

extracting the price and product name values from the supplier web page at locations identified by the pointers; and updating the first record with the price extracted from the supplier web page when the price has changed from the price submitted by the first user, whereby pointers locate the price and product name on the supplier web page, allowing for automatic database refreshing.

16. The computer-implemented method of claim 15 further comprising:

correcting an error in the price or product name in the first record by:
  displaying the price and product name from the first record to a third user;
  displaying the supplier web page to the third user;
  receiving a corrected price or a corrected product name from the third user;
  sending the first user a notice of correction of the first record;
  updating the first record using the information from the third user;

wherein when subsequent users view information from the first record:
  increasing the first reward count for the first user and a third reward count for the third user when the first record is displayed to a subsequent user;
  wherein the first reward count and the third reward count are increased as other users view the first record after the third user makes a correction;

whereby the first user and the third user share future rewards when the third user corrects information submitted by the first user.

17. A computer-program product comprising:

a computer-usable medium having computer-readable program code means embodied therein for creating and maintaining a product/price database, the computer-readable program code means in the computer-program product comprising:

database means for storing product records, each product record containing a price, a product name, and a supplier web-address;

data-input means for receiving supplier web-addresses from submitting users;

record store means, coupled to the database means, for storing the price and name fields and the supplier web-address to a record in the database means when the data-input means receives the supplier web-address from a submitting user;

submission reward means, activated by the record store means, for adding a reward to a submitting user when the record is stored in the database means;

data verification means, coupled to the data-input means, for verifying price and product information received from submitting users by fetching a supplier web page using the supplier web-address, and extracting price and name fields from the supplier web page;

search means, coupled to the database means, for retrieving matching records from the database means that meet search criteria from searching users, the search means displaying information from matching record to the searching users; and use-reward means, coupled to the search means, for adding another reward to the submitting user when a portion of the record is viewed by the searching user;

whereby submitting users are rewarded for submitting price or product information and are rewarded when searching users view the price or product information submitted.

18. The computer-program product of claim 17 wherein the computer-readable program code means further comprises:

correction means, coupled to the search means, for receiving a correction from a correcting user, the correction means updating a record in the database means in response to the correction;

correction-rewards means, activated by the correction means, for adding a reward to the correcting user when the record in the database means is updated with the correction and when searching users view the corrected information.

19. The computer-program product of claim 18 wherein the computer-readable program code means further comprises:

split-rewards means, coupled to the search means, for splitting a reward among the submitting user and the correcting user when a corrected record is viewed by a searching user, whereby rewards are split among a submitting user and a correcting user.

* * * * *